US009960884B2

United States Patent
Wang et al.

(10) Patent No.: US 9,960,884 B2
(45) Date of Patent: *May 1, 2018

(54) SYSTEM AND METHOD FOR CHANNEL STATE INFORMATION FEEDBACK IN WIRELESS COMMUNICATIONS SYSTEMS

(71) Applicant: Futurewei Technologies, Inc., Plano, TX (US)

(72) Inventors: Jianguo Wang, Beijing (CN); Yang Tang, San Diego, CA (US); Yongxing Zhou, Beijing (CN); David Jean-Marie Mazzarese, Beijing (CN); Mattias Frenne, Uppsala (SE)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 334 days.

This patent is subject to a terminal disclaimer.

(21) Appl. No.: 14/595,736

(22) Filed: Jan. 13, 2015

(65) Prior Publication Data

US 2015/0124707 A1 May 7, 2015

Related U.S. Application Data

(63) Continuation of application No. 13/233,134, filed on Sep. 15, 2011, now Pat. No. 9,100,169.

(Continued)

(51) Int. Cl.
*H04L 1/06* (2006.01)
*H04L 1/00* (2006.01)
(Continued)

(52) U.S. Cl.
CPC ............. *H04L 1/06* (2013.01); *H04B 7/0469* (2013.01); *H04B 7/0478* (2013.01); *H04B 7/063* (2013.01);
(Continued)

(58) Field of Classification Search
None
See application file for complete search history.

(56) References Cited

U.S. PATENT DOCUMENTS

2005/0129137 A1 6/2005 Yamada et al.
2007/0217539 A1 9/2007 Ihm et al.
(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 9), 3GPP TS 36.211 V9.1.0, Mar. 2010, 85 pages. *H04W 24/10* (2009.01)
*H04B 7/04* (2017.01)
*H04B 7/06* (2006.01)

(Continued)

*Primary Examiner* — Huy D Vu
*Assistant Examiner* — Bao G Nguyen
(74) *Attorney, Agent, or Firm* — Slater Matsil, LLP

(57) ABSTRACT

A system and method for channel state information feedback in wireless communications systems are provided. A method for reporting channel information includes determining, at a user equipment, a channel information type for first channel information to be reported to a communications controller, determining the first channel information conditioned on previously reported channel information and on the channel information type, and reporting the first channel information, the channel information type, or a combination thereof, to the communications controller.

32 Claims, 10 Drawing Sheets

Related U.S. Application Data

(60) Provisional application No. 61/383,251, filed on Sep. 15, 2010.

(52) U.S. Cl.
CPC ........... *H04B 7/065* (2013.01); *H04B 7/0626* (2013.01); *H04B 7/0632* (2013.01); *H04B 7/0634* (2013.01); *H04B 7/0639* (2013.01); *H04L 1/0026* (2013.01); *H04W 24/10* (2013.01)

(56) References Cited

U.S. PATENT DOCUMENTS

| | | |
|---|---|---|
| 2008/0013610 A1 | 1/2008 | Varadarajan et al. |
| 2008/0192853 A1 | 8/2008 | Kent et al. |
| 2008/0219370 A1 | 9/2008 | Onggosanusi et al. |
| 2009/0181691 A1 | 7/2009 | Kotecha et al. |
| 2009/0190528 A1 | 7/2009 | Chung et al. |
| 2009/0262695 A1 | 10/2009 | Chen et al. |
| 2009/0296850 A1* | 12/2009 | Xu ................... H03M 13/136 375/295 |
| 2010/0002598 A1 | 1/2010 | Pan et al. |
| 2011/0216846 A1 | 9/2011 | Lee et al. |
| 2011/0249578 A1 | 10/2011 | Nayeb Nazar et al. |
| 2012/0008587 A1 | 1/2012 | Lee et al. |
| 2012/0063500 A1* | 3/2012 | Wang ................... H04L 1/0026 375/224 |
| 2012/0140708 A1 | 6/2012 | Choudhury et al. |

OTHER PUBLICATIONS

Alcatel-Lucent, et al., "Way Forward on 8Tx Codebook for Rel.10 DL MIMO," 3GPP TSG RAN WG1 62, R1-105011, Madrid, Spain, Aug. 23-27, 2010, 6 pages.

International Search Report received in Application No. PCT/US2011/05741 dated Jan. 10, 2012, 2 pages.

"3rd Generation Partnership Project; Technical Specification Group Radio Access Network; Evolved Universal Terrestrial Radio Access (E-UTRA); Physical layer procedures (Release 9)," 3GPP TS 36.213, V9.2.0, Jun. 2010, 80 pages.

Huawei, "Double codebook based Differential feedback for MU-MIMO enhancement," 3GPP TSG RAN WG1#61bis, R1-103449, Agenda Item: 6.3.4, Jun. 28-Jul. 2, 2010, 10 pages.

Huawei, et al., "Further clarification of PUCCH 2-1 in Rel.10, 3GPP TSG RAN WG1#62bis," R1-105134, Agenda Item: 6.3.2.2, Oct. 11-15, 2010, 7 pages.

Huawei, et al., "Further clarification of PUCCH 2-1," 3GPP TSG RAN WG1#63, R1-105841, Agenda Item: 6.3.2.1, Nov. 15-19, 2010, 9 pages.

Samsung, et al., "Correction on PUSCH and PUCCH modes," 3GPP TSG-RAN1 WG1 Meeting #66, R1-112783, V10.2.0, Aug. 23, 2011, 12 pages.

Alcatel-Lucent, et al., "Way Forward on CSI Feedback for Rel.10 DL MIMO," 3GPP TSG RAN WG1 62, Agenda Item: 6.3.3, R1-104476, Aug. 23-27, 2010, 5 pages.

"Extended European Search Report," Application No. 11825930.8, Applicant: Huawei Technologies Co., Ltd., dated Jul. 11, 2013, 10 pages.

"Introduction of Rel-10 LTE-Advanced features in 36.213," Motorola, R1-105111, V.9.2.0, Sep. 9, 2010, 81 pages.

"Korean Intellectual Property Office Notice to Submit a Response," Patent Application No. 10-2013-7006517, Applicant: Huawei Technologies Co., Ltd., Jan. 24, 2014, 6 pages.

"PCT International Search Report," International Application No. PCT/US2011/051741, Applicant: Huawei Technologies Co., Ltd., Jan. 10, 2012, 2 pages.

"Written Opinion of the International Searching Authority," International Application No. PCT/US2011/051741, Applicant: Huawei Technologies Co., Ltd., dated Jan. 10, 2012, 7 pages.

\* cited by examiner

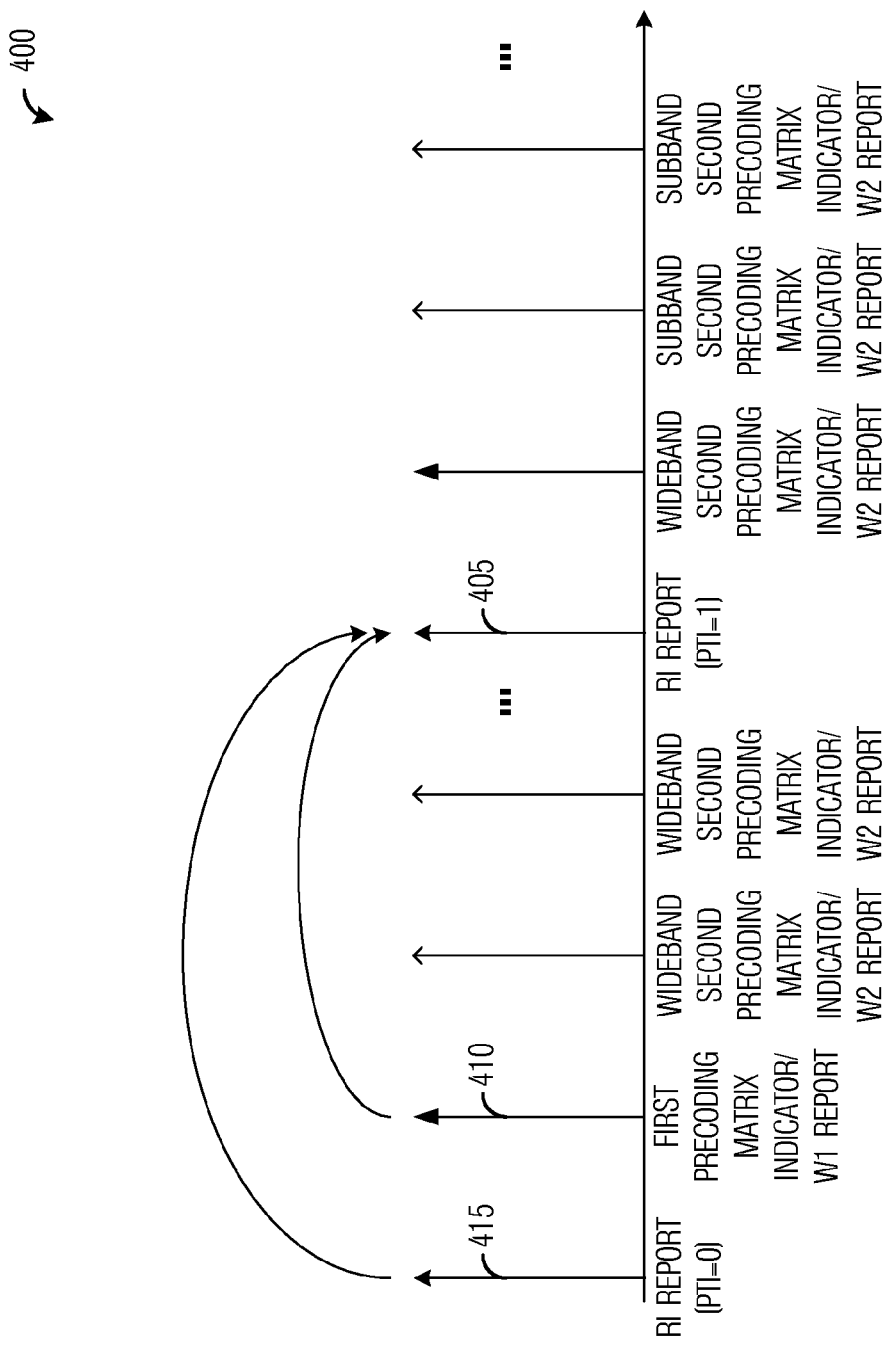

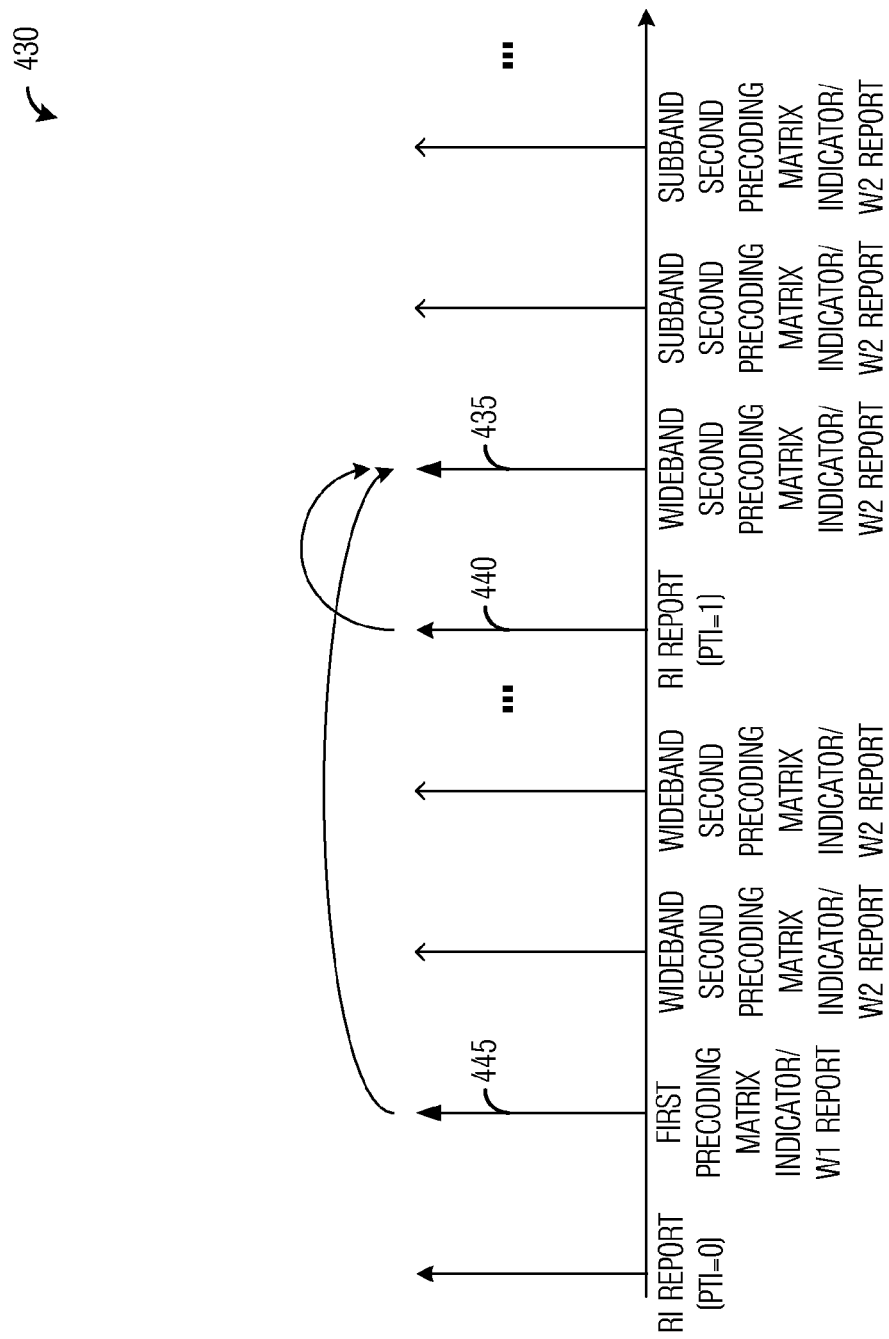

SYSTEM AND METHOD FOR CHANNEL STATE INFORMATION FEEDBACK IN WIRELESS COMMUNICATIONS SYSTEMS

This application is a continuation of U.S. Non-Provisional application Ser. No. 13/233,134, filed Sep. 15, 2011, entitled "System and Method for Channel State Information Feedback in Wireless Communications Systems," which claims the benefit of U.S. Provisional Application No. 61/383,251, filed on Sep. 15, 2010, entitled "Method and Apparatus for CSI Feedback for Closed Loop MIMO Systems," all of which applications are hereby incorporated herein by reference.

TECHNICAL FIELD

The present invention relates generally to digital communications, and more particularly to a system and method for channel state information feedback in wireless communication systems.

BACKGROUND

In a wireless communications system, the communications system's capacity may be significantly improved when a first device has full or partial knowledge of a channel (e.g., channel information) over which it will be transmitting. The channel information may be referred to as channel state information (CSI). CSI may be obtained by the first device over a reverse feedback channel, where a second device that receives transmissions made by the first device transmits CSI to the first device over the reverse feedback channel.

Generally, communications in a communications system occur over uni-directional links. A first uni-directional link may be referred to as a downlink (DL) that originates at a communications controller (also commonly referred to as a base station, a NodeB, an enhanced NodeB (eNB), and so on) and ends at a communications device (also commonly referred to as a mobile station, a terminal, a subscriber, a User Equipment (UE), and so forth). A second uni-directional link may be referred to as an uplink (UL) that originates at the communications device and terminates at the communications controller. In the DL, the communications controller may be the first device and the communications device may be the second device.

The capacity and coverage of the wireless communication system can be significantly improved by using multiple antennas at transmitter and/or receiver. Such wireless communications systems are referred to as Multiple Input Multiple Output (MIMO) systems and can exploit the spatial dimension of the communication channel to transmit several parallel information carrying signals, commonly referred to as spatial multiplexing. The additional gains can be achieved by adaptation of a number of simultaneously transmitted information carrying signals to a level that the channel can support, which is commonly referred to as transmission rank adaptation.

Additional gain can be also obtained by using precoding that adjusts the phase and amplitude of the signals to better fit current channel conditions. The aforementioned signals form a vector-valued signal and the adjustment operation can be implemented as multiplication with a precoding matrix. Based on information related to channel conditions, the precoding matrix can be chosen from a finite and countable set, a so-called codebook. A different codebook can be defined for different transmission rank and the precoding matrix can be indexed by a precoding matrix indicator from the corresponding codebook.

SUMMARY OF THE INVENTION

These technical advantages are generally achieved, by example embodiments of the present invention which provide a system and method for channel state information feedback in wireless communications systems.

In accordance with an example embodiment of the present invention, a method for reporting channel information is provided. The method includes determining, at a user equipment, a channel information type for first channel information to be reported to a communications controller, determining the first channel information conditioned on previously reported channel information and on the channel information type, and reporting the first channel information, the channel information type, or a combination thereof, to the communications controller.

In accordance with another example embodiment of the present invention, a user equipment is provided. The user equipment includes a processor, and a transmitter coupled to the processor. The processor determines a channel information type for first channel information to be reported to a communications controller, and determines the first channel information conditioned on previously reported channel information and on the channel information type. The transmitter reports the first channel information, the channel information type, or a combination thereof, to the communications controller.

In accordance with another example embodiment of the present invention, a communications system is provided. The communications system includes a communications controller, and a user equipment coupled to the communications controller. The communications controller controls user equipment. The user equipment determines a channel information type for first channel information to be reported to the communications controller, determines the first channel information conditioned on previously reported channel information and on the channel information type, and reports the first channel information, the channel information type, or a combination thereof, to the communications controller.

One advantage disclosed herein is that for some types of feedback information that a UE is incapable of computing may be determined conditioned on (or based on) previously reported feedback information. The use of previously reported feedback information to condition these types of feedback information yields better overall communications system performance than using randomly selected or fixed information for these types of feedback information.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 4a illustrates an example first diagram of CSI feedback transmitted by a UE to an eNB, wherein one of the CSI is determined conditioned on previously reported CSI according to example embodiments described herein;

FIG. 4b illustrates an example second diagram of CSI feedback transmitted by a UE to an eNB, wherein one of the CSI is determined conditioned on previously reported CSI according to example embodiments described herein;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One exemplary embodiment of the invention relates to determining channel state information (CSI) that is unavailable in a current operating mode or CSI report sequence by conditioning it on previously reported CSI. The UE may determine the CSI using the previously reported CSI and channel information type to help formulate the CSI. For example, a UE that provides CSI to an eNB may generate certain types of CSI that are unavailable in a current operating mode by using previously reported CSI and channel information type to help it generate the CSI that more accurately captures the channel state than a randomly selected CSI or a fixed CSI value would be able to capture. The UE may then report the CSI and/or the channel information type.

The present invention will be described with respect to example embodiments in a specific context, namely a Third Generation Partnership Project (3GPP) Long Term Evolution (LTE) Release-10 compliant communications system. The invention may also be applied, however, to other standards compliant and non-standards compliant communications systems that use dual index or double codebook based CSI feedback to improve overall communications system performance.

Figure 1A:
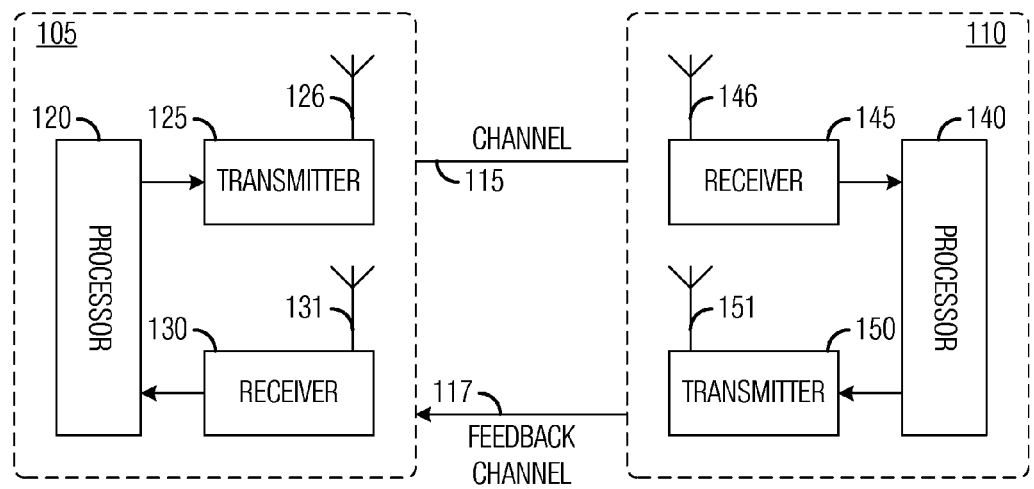
FIG. 1a illustrates an example portion of a wireless communications system according to example embodiments described herein.

FIG. 1a illustrates a portion of a wireless communications system 100. Wireless communications system 100 includes an enhanced NodeB (eNB) 105 and a User Equipment (UE) 110. Transmissions from eNB 105 to UE 110 occur over channel 115. UE 110 estimates channel 115 and provides channel information regarding channel 115 (such as CSI) to eNB 105. UE 110 may utilize a feedback channel 117 to transmit the channel information regarding channel 115 to eNB 105.

While it is understood that communications systems may employ multiple eNBs capable of communicating with a number of UEs, only one eNB and one UE are illustrated for simplicity.

eNB 105 includes a processor 120, a transmitter 125 with one or more transmit antennas 126, and a receiver 130 with one or more receive antennas 131. Similarly, UE 110 includes a processor 140, a receiver 145 with one or more receive antennas 146, and a transmitter 148 with one or more transmit antennas 151.

Receiver 145 of UE 110 receives transmissions made by transmitter 125 of eNB 105 and from the received transmissions, processor 140 may compute channel information, such as channel mean, spatial domain channel correlation matrix, long and/or short term channel statistics, functions thereof, and so forth. The channel information (in full or partial form) may be transmitted back to eNB 105, where it is received by receiver 130 and provided to processor 120 that makes use of the channel information to design future transmissions. The channel information may be quantized to help reduce feedback overhead.

The channel information fed back to eNB 105 by UE 110 may be in the form of time domain channel information, frequency domain channel information, or a combination thereof. Time domain channel information may be in the form of short term channel information or long term channel information, while frequency domain channel information may be in the form of sub-band channel information or wideband channel information. In general, long term channel information and/or wideband channel information may be collectively referred to as "long term" and/or "wideband" channel statistics or "long term wideband" channel statistics. Short term channel information may include channel mean, and so on.

Figure 1B:
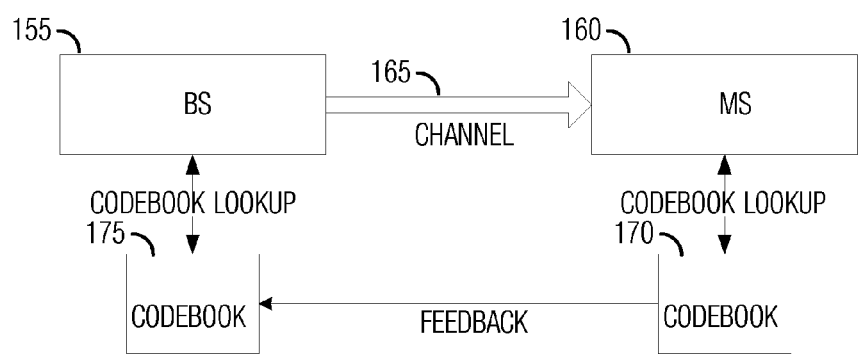
FIG. 1b illustrates an example wireless communications system utilizing a codebook in communications channel information feedback according to example embodiments described herein.

FIG. 1b illustrates a wireless communications system 150 utilizing a codebook in communications channel information feedback. Wireless communications system 150 includes a eNB 155 transmitting to a UE 160 over a channel 165. In order to improve performance, UE 160 measures and transmits information related to channel 165 (i.e., channel information) to eNB 155. Since a feedback channel used to transmit the feedback information may have limited resources, reducing feedback information overhead may help to improve overall communications system performance.

One technique commonly used to reduce feedback information overhead for some forms of channel information is to use a codebook to quantize the channel information and then feeding back only an index into the codebook to eNB 155 instead of the actual channel information of channel 165. Both UE 160 and eNB 155 possess copies of the codebook (shown as codebook 170 for UE 160 and codebook 175 for eNB 155). The codebook used for quantizing the channel information of channel 165 may be predefined and fixed.

Figure 2A:
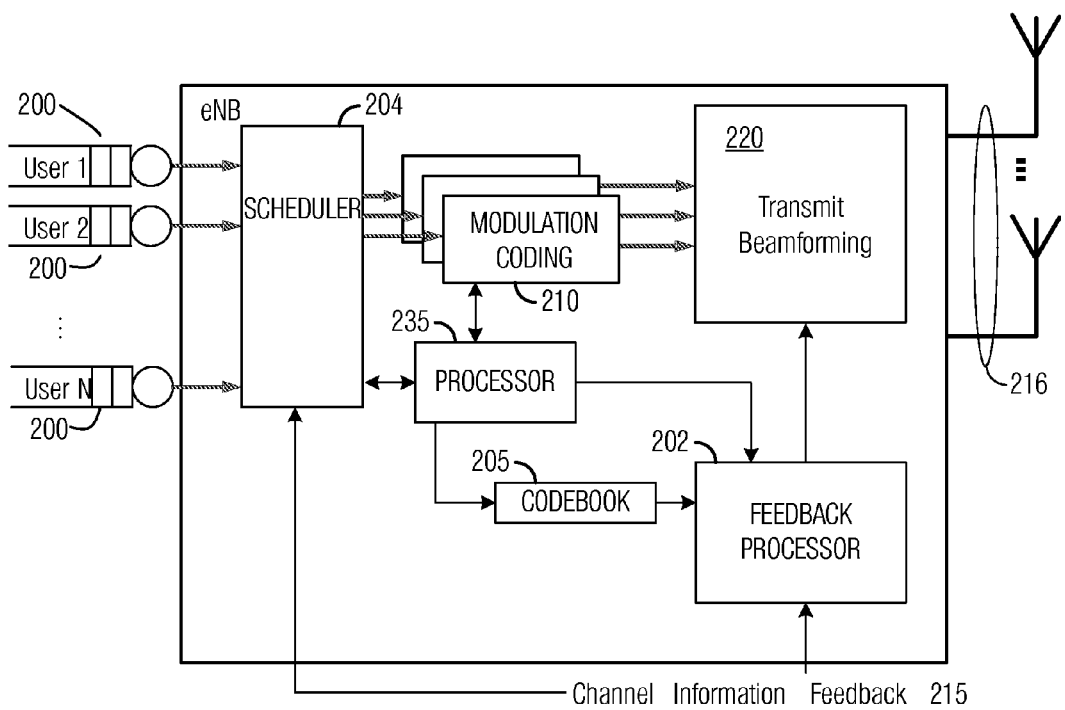
FIG. 2a illustrates an example eNB according to example embodiments described herein.

FIG. 2a illustrates an eNB 201. Data 200, in the form of bits, symbols, or packets for example, destined for a plurality of UEs being served are sent to a scheduler 204, which decides which UEs will be transmitted to in a given time and/or frequency opportunity. For example, with Multi-User Multiple Input Multiple Output (MU-MIMO), scheduler 204 may select L out of K UEs for transmission at a given time and frequency resource, where K and L are integer values and L is less than or equal to K. The selection of the L UEs may be in accordance with factors such as maximizing throughput, service history, UE priority, information priority, and so forth. While for Single User MIMO (SU-MIMO), scheduler 204 may select single UEs for transmission at a given time and frequency resource.

Data for UEs are processed by modulation and coding block 210 to convert to transmitted symbols and add redundancy for the purpose of assisting with error correction or error detection. The modulation and coding scheme is chosen based in part on or in accordance with information about the channel information feedback 215.

The output of modulation and coding block 210 is passed to a transmit beamforming block 220, which maps the coded and modulated stream for each UE onto a beamforming vector. The beamformed outputs are coupled to antennas 216 through RF circuitry. The transmit beamforming vectors may be determined by transmit beamforming block 220, which may determine the transmit beamforming vectors in accordance with channel information feedback 215 as well as information from scheduler 204, which may include information regarding the UEs selected for transmission, and so on.

Feedback processor 202, among other operations, decodes feedback information from channel information feedback 215. Decoding feedback information may involve the use of a codebook 205 if channel information feedback 215 was quantized using a codebook by a UE.

The channel information may be fed back with different periodicity. As an example, Rank Indication (RI) may be fed back at a relatively long period, as is long term channel information, while wideband Precoding Matrix Indicator (PMI) and/or Channel Quality Indicator (CQI); and subband PMI and/or CQI (subband PMI/CQI) may be fed back at a relatively short period. Feedback processor 202 may need to process the received channel information feedback 215 differently in accordance with the type of channel information.

Additionally, channel information feedback 215 may be encoded to protect from transmission errors. The encoding may be jointly or separately performed. If so protected, feedback processor 202 may remove the encoding used to protect channel information feedback 215 to produce feedback information.

Scheduler 204 may use any of the known scheduling disciplines in the literature including round robin, maximum sum rate, proportional fair, minimum remaining processing time, or maximum weighted sum rate; generally scheduling decisions are in accordance with channel information feedback 215 received from the plurality of UEs. Scheduler 204 may decide to send information to a single UE via transmit beamforming (SU-MIMO) or may decide to serve multiple UEs simultaneously through MU-MIMO communications.

Modulation and coding unit 210 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment may be made in accordance with channel information feedback 215 in a preferred embodiment and may be determined jointly in scheduler 204.

While not explicitly illustrated, it is obvious to those of ordinary skill in the art that OFDM modulation can be used. Further, any number of multiple access techniques could be used including orthogonal frequency division multiple access, code division multiple access, frequency division multiple access, or time division multiple access. The multiple access technique may be combined with the modulation and coding unit 210 or the transmit beamforming block 220 among others.

Channel information feedback 215 may, for purposes of illustration, be in the form of quantized channel measurements, modulation, coding, and/or spatial formatting decisions, received signal strength, and signal-to-interference-plus-noise measurements. A processor 235 may be used to execute applications for eNB 201, and may be used to control the operation of units such as feedback processor 202, codebook adjust unit 206, modulation and coding unit 210, scheduler 204, and so forth.

Figure 2B:
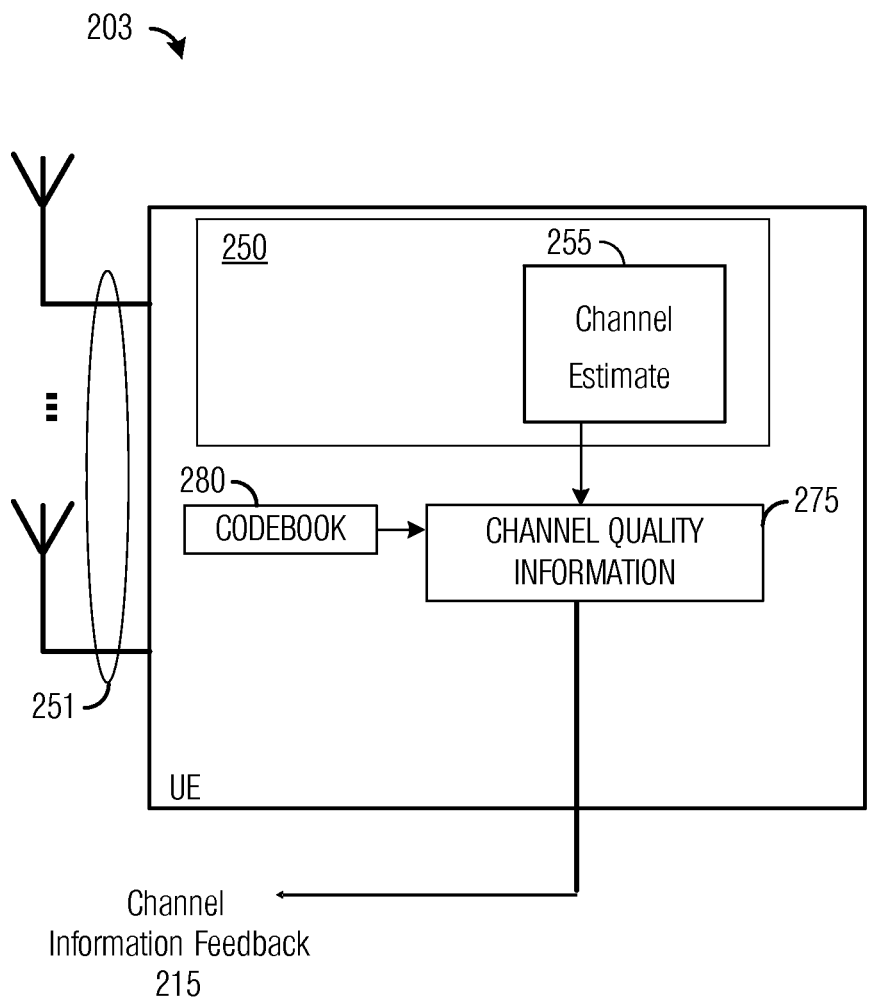
FIG. 2b illustrates an example UE according to example embodiments described herein.

FIG. 2b illustrates UE 203. UE 203 may have one or more receive antennas 251, connecting through RF circuitry to a receiver signal processing unit 250. Receiver signal processing unit 250 includes a channel estimation unit 255.

Channel estimation unit 255 may employ any number of algorithms known in the art including least squares, maximum likelihood, maximum a postiori, Bayesian estimator, adaptive estimator, a blind estimator, or so forth, to estimate a channel between UE 203 and its serving eNB. Some algorithms exploit known information inserted into the transmit signal in the form of training signals, training pilots, while others use structure in the transmitted signal such as cyclostationarity to estimate coefficients of the channel between the eNB and the UE.

Channel quality information unit 275 generates channel information based on channel estimates from channel estimation unit 255 and potentially previously reported channel information. Channel quality information unit 275 may also make use of a codebook 280 to generate the channel information. Channel information may include rank indicator, precoding matrix indicator, channel quality indicator, and so on. The channel information may be placed in a feedback message to produce channel information feedback 215. Channel quality information unit 275 may also apply an error correcting code to protect information in the feedback message from errors.

The above codebook based precoding for closed loop MIMO is used in the Third Generation Partnership (3GPP) Long Term Evolution (LTE) Release-8 system. The User Equipment (UE) would typically evaluate the different transmission rank and the precoding matrices in the codebook and report a preferred rank indicator (RI) and a precoding matrix indicator (PMI) to its eNB. The eNB would then decide the transmission rank and the precoding matrix, based on the received reports. Furthermore, Channel Quality Indicator(s) (CQI) calculated conditioned on the use of the selected precoding matrix is (are) reported to eNB for link adaptation, scheduling and user pairing in MU-MIMO. Through feedback of the above channel state information (CSI) including RI, PMI, CQI, and so forth, the close loop MIMO system can adapt the transmission to the current channel conditions and hence achieve significant performance gain.

Periodic CSI report using a Physical Uplink Control Channel (PUCCH) and aperiodic CSI report using a Physical Uplink Shared Channel (PUSCH) for CQI, PMI, RI are defined and configured by higher layer signaling in 3GP LTE Release-8. Furthermore, the entire system bandwidth is partitioned into multiple subbands. RI is usually determined assuming transmission on system bandwidth. While CQI and PMI calculated assuming transmission on system bandwidth is called wideband CQI and PMI. However, CQI and PMI calculated assuming transmission on subband is called subband CQI and PMI.

A periodic CSI reporting mode defined in 3GPP LTE Release-8 is referred to as PUCCH mode 2-1 where RI, wideband CQI and wideband PMI, and UE selected subband CQI reports are respectively reported in different subframes. A UE selected subband CQI report in a certain subframe describes the channel quality in a particular part or in particular parts of the bandwidth described subsequently as a bandwidth part (BP) or parts. A BP consists of multiple frequency-consecutive subbands and is indexed in the order of increasing frequency and non-increasing sizes starting at the lowest frequency. Collectively, all of the BPs span the entire system bandwidth.

For UE selected subband CQI feedback, a single subband out of all subbands of a BP is selected along with a corresponding label indexed in the order of increasing frequency. The subband label will be reported with subband CQI report in the same subframe. The wideband CQI and wideband PMI report has period $H \cdot N_{pd}$. The integer H is defined as $H = J \cdot K + 1$, where J is the number of bandwidth parts. Between every two consecutive wideband CQI/wideband PMI reports, the remaining J·K reporting instances are used in sequence for subband CQI reports on K full cycles of BPs. Each full cycle of BPs shall be in increasing order starting from BP 0 to BP J−1. The reporting interval of the RI reporting is an integer multiple $M_{RI}$ of period $H \cdot N_{pd}$ (in subframes). The parameter $N_{pd}$ is the report period of subband CQI. Parameters K and $M_{RI}$ are all configured using higher-layer signaling.

To improve granularity of spatial quantization without large overhead increment, a double codebook or dual index based feedback framework was adopted for 3GPP LTE Release-10 systems, where a precoder or a precoding matrix W for a subband is a matrix product of two matrices W1 and W2. Matrix W1 targets long-term or wideband channel properties and matrix W2 targets short-term or frequency-selective channel properties. W1 and W2 are actually from two different codebooks C1 and C2, respectively. For convenience, hereinafter, the indices for W1 and W2 are referred to as first PMI and the second PMI, respectively. Equivalently, the first PMI and the second PMI can be said to index the matrix W, the matrix product of W1 and W2.

An extension of PUCCH Mode 2-1 in 3GPP LTE Release-8 was adopted in 3GPP LTE Release-10, which can be summarized as follows.

W is determined from 3-subframe report conditioned upon the latest RI report.
Reporting format
   Report 1: RI and 1-bit precoder type indication (PTI)
   Report 2:
      PTI=0: W1 will be reported;
      PTI=1: wideband CQI and wideband W2 will be reported
   Report 3:
      PTI=0: wideband CQI and wideband W2 will be reported
      PTI=1: subband CQI, subband W2, and a subband selection indicator or predefined cycling.

As shown above, a new CSI report, PTI, is introduced, leading to two possible CSI report sequences that are dependent on PTI value. A first report sequence comprises RI with PTI=0; W1 or first PMI; and wideband CQI, and wideband W2 or wideband second PMI. A second report sequence comprises RI with PTI=1; wideband CQI, and wideband W2 or wideband second PMI; and subband CQI, and subband W2 or subband second PMI. Furthermore, a subband selection indicator such as a subband label within a bandwidth part (BP) can be reported with subband CQI and subband second PMI. Alternatively, subband label or subband indicator can be obtained at the UE and the eNB from a predefined cycling pattern known for the UE and the eNB. Hereinafter, it is assumed that a subband selection indicator or subband label can be reported with subband CQI and subband second PMI except that an explicit description about subband selection indicator or subband label is specifically provided.

Figure 3A:
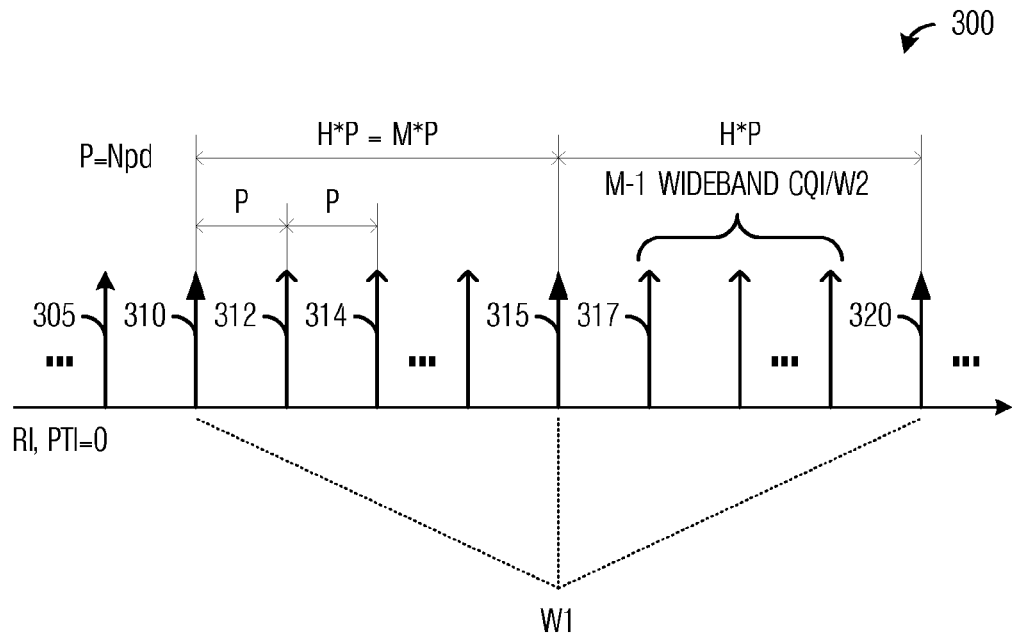
FIG. 3a illustrates an example diagram of a first CSI report sequence as transmitted by a UE to an eNB with PTI=0 according to example embodiments described herein.

FIG. 3a illustrates a diagram 300 of a first CSI report sequence as transmitted by a UE to an eNB with PTI=0, where a particular subframe is depicted as a pulse. The first CSI report sequence fed back from a UE to an eNB with PTI=0 may begin with a RI with PTI=0 report (shown as subframe 305) followed by a number of W1 or wideband first PMI reports (shown as subframe 310, subframe 315, and subframe 320). In between the feeding back of W1 or wideband first PMI reports, the UE may feedback M−1 wideband CQI and W2 or wideband second PMI reports (shown as pulse 312, pulse 314, and pulse 317), where M is a parameter that may be signaled to the UE through higher layer signaling, for example.

A time period between feedbacks of the M−1 wideband CQI and wideband W2 or wideband second PMI reports may be defined as value P. Hence, a duration between consecutive feedbacks of W1 or wideband first PMI reports may be defined as M*P (or equivalently, H*P).

In summary, the first CSI report sequence may be defined as a sequence of CSI reports beginning with a RI report with PTI=0 followed by a number of W1 or wideband first PMI reports, with M−1 wideband CQI and W2 or wideband second PMI reports in between adjacent W1 or wideband first PMI reports.

Figure 3B:
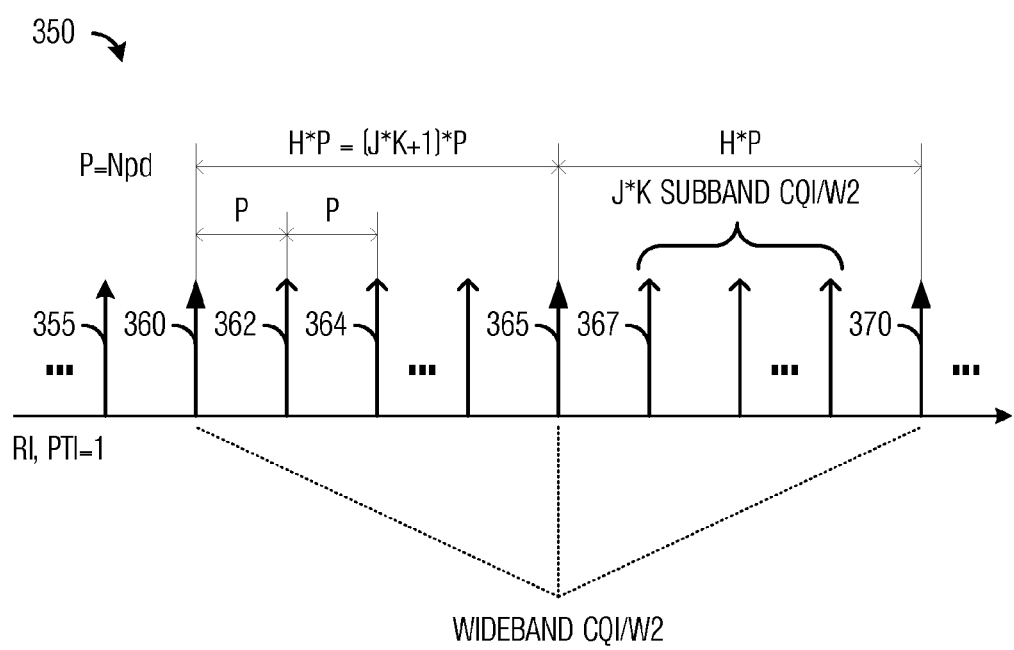
FIG. 3b illustrates an example diagram of a second CSI report sequence as transmitted by a UE to an eNB with PTI=1 according to example embodiments described herein.

FIG. 3b illustrates a diagram 350 of a second CSI report sequence as transmitted by a UE to an eNB with PTI=1, where a particular subframe is depicted as a pulse. The second CSI report sequence fed back from a UE to an eNB with PTI=1 may begin with a RI with PTI=1 report (shown as subframe 355) followed by a number of wideband CQI and wideband W2 or wideband second PMI reports (shown as pulse 360, pulse 365, and pulse 370). In between the feeding back of wideband CQI and wideband W2 or wideband second PMI reports, the UE may feedback J*K subband CQI and subband W2 or subband second PMI reports (shown as subframe 362, subframe 364, and subframe 367), where J is the number of BPs and K is a parameter that may be signaled to the UE through higher layer signaling, for example.

Again, a time period between feedbacks of the J*K subband CQI and subband W2 or subband second PMI reports may be defined as value P. Hence, a duration between consecutive feedbacks of wideband CQI and wideband W2 or second PMI reports may be defined as (J*K+1)*P.

In summary, the second CSI report sequence may be defined as a sequence of CSI reports beginning with a RI report with PTI=1 followed by a number of wideband CQI and wideband W2 or wideband second PMI reports, with J*K subband CQI and subband W2 or subband second PMI reports in between adjacent wideband CQI and wideband W2 or wideband second PMI reports.

Although the CSI report sequences (e.g., the first CSI report sequence and the second CSI report sequence) in the CSI feedback are well defined, the determination of some of the CSI to be fed back is not so clearly defined. There exist two related issues to be addressed:

How is RI to be determined when PTI=1?
How is W2 to be determined when PTI=1?

The above issues arise from an absence of W1 or first PMI in the second CSI report sequence.

According to an example embodiment, the CSI that are not clearly defined, such as RI and/or W2 when PTI=1, may be determined conditioned on previously reported CSI. In other words, the UE may use previously reported CSI to help it generate the CSI that are not clearly defined.

FIG. 4a illustrates a first diagram 400 of CSI feedback transmitted by a UE to an eNB, wherein one of the CSI is determined conditioned on previously reported CSI. First diagram 400 displays a number of feedbacks of CSI by a UE to a BS, including a RI with PTI=1 report (shown as subframe 405). However, as discussed previously, the UE may not know how to determine the RI with PTI=1 report.

According to an example embodiment, the UE may be able to determine the RI with PTI=1 report conditioned on a previously reported first PMI or W1 report (shown as subframe 410) and a previously reported RI with PTI=0 report (shown as subframe 415). A detailed description of an exemplary determination of the RI with PTI=1 report from the previously reported first PMI or W1 report and the previously reported RI with PTI=0 report is provided below. Although it may be possible to utilize any previously reported W1 or first PMI report and any previously reported RI with PTI=0 report to determine the RI with PTI=1 report as long as the previously reported CSI belong to a different CSI report sequence, the most recently reported (or similarly, last reported) W1 or first PMI report and the most recently reported (or similarly, last reported) RI with PTI=0 report (as long as the previously reported CSI belong to a different CSI report sequence) may produce the RI with PTI=1 report that provides the best overall communications system performance.

As an illustrative example, consider codebook based precoding for closed loop MIMO communications system which may be expressed as $$y = HPx + n,$$

where vector y represents the received signals, H represents the channel matrix, P represents the precoding matrix or vector, x represents the vector consisting of signals to be transmitted, and n represents the observed noise or interference at UE.

For a dual index or double codebook based codebook, such as the codebook for eight transmit antenna in LTE Release-10, a precoding matrix recommended by a UE is a matrix product expressible as $$W_{i_1,i_2} = W_{i_1} W_{i_2}.$$

For convenience, the precoding matrix or codewords in a rank r codebook may be expressed as $$W_{i_1,i_2}^{(r)} = W_{i_1}^{(r)} W_{i_2}^{(r)}.$$

Here rank=r, while $i_1$ and $i_2$ are the first PMI and second PMI, respectively, and are used to index $W_{i_1}^{(r)}$ and $W_{i_2}^{(r)}$, also equivalently to jointly index matrix $W_{i_1,i_2}^{(r)}$.

The determination of the RI with PTI=1 report conditioned on the most recently reported RI with PTI=0 report and the most recently reported W1 or first PMI report may be expressed as $$r_1^* = \arg\max_{r_1 \in R_{r_0^*,i_1^*}^{(1)}} \left( \max_{i_2} f_{WB}(W_{i_1^*,i_2}^{(r_1)}) \right),$$

where $r_0^*$ and $i_1^*$ are the most recently reported RI with PTI=0 report and the most recently reported W1 or first PMI report, respectively, and $R_{r_0^*,i_1^*}^{(1)}$ represents a set of allowable $r_1$ values such that W1 corresponding to first PMI $i_1^*$ in a rank-$r_1$ codebook is same as W1 corresponding to first PMI $i_1^*$ in a rank-$r_0^*$ codebook. More specifically, the candidate $r_1$ can be given in Table 1.

TABLE 1

Candidate RI with PTI = 1 reports conditioned on previously reported RI with PTI = 0 and a first PMI.

| | $r_0^*$, the last reported RI with PTI = 0 | | | |
|---|---|---|---|---|
| | | | 5, 6, 7 | |
| | 1, 2 | 3, 4 | $i_1^* = 0$  $i_1^* = 1, 2, 3$ | 8 |
| Candidate values of $r_1$ | 1, 2 | 3, 4 | 5, 6, 7, 8   5, 6, 7 | 5, 6, 7, 8 |

Therefore, given a value of $r_0^*$, the UE may determine a set of candidate values for $r_1$ conditioned on the value of $r_0^*$ (using Table 1, for example). In other words, the value of $r_0^*$ is used to determine (condition) the set of candidate values for $r_1$. The UE may then select a value from the set of candidate values as the RI with PTI=1 report. For example, the UE may make use of the channel measurement to select the value from the set of candidate values. As an illustrative example, consider a situation wherein $r_0^*=4$, then the set of candidate values for $r_1$ comprises 3 and 4. The UE may then select either 3 or 4 for the RI with PTI=1 report depending on the value of its channel measurement. As another illustrative example, consider a situation wherein $r_0^*=6$ and $i_1^*=1$, then the set of candidate values for $r_1$ comprises 5, 6 and 7. The UE may then select either 5 or 6 or 7 for the RI with PTI=1 report depending on the channel measurement.

Furthermore, $$f_{WB}(W_{i_1^*,i_2}^{(r_1)}) = \sum_{s \in S} C_s(W_{i_1^*,i_2}^{(r_1)}),$$

where S represents the set of subbands and spans the entire system bandwidth, and s represents a subband belonging to S.

Alternatively, the determination of RI with PTI=1 report conditioned on the most recently reported RI with PTI=0 and W1 or first PMI report can also be expressed as $$r_1^* = \arg\max_{r_1 \in R_{r_0^*,i_1^*}^{(1)}} \left( \sum_{s \in S} \max_{i_2} (C_s(W_{i_1^*,i_2}^{(r_1)})) \right),$$

where $C_s(W_{i_1^*,i_2}^{(r_1)})$ represents the total throughput, capacity, or other metrics when transmitting utilizing precoding matrix $W_{i_1^*,i_2}^{(r_1)}$ on subband s and it can be derived based on the following equation $$y=HPx+n, \quad P=W_{i_1^*,i_2}^{(r_1)},$$

by utilizing MIMO capacity formula or other metric such as mutual information based metric, for example.

Furthermore, the rank indicator with PTI=1 can be further encoded into at most a two bit representation. As an illustrative example, from Table 1, if $r_0^*=1, 2$, one bit can be used to encode $r_1^*$: 0 for $r_1^*=1$ and 1 for $r_1^*=2$, or 0 for $r_1^*=2$ and 1 for $r_1^*=1$; while if $r_0^*=3, 4$ then, one bit can be used to encode $r_1^*$: 0 for $r_1^*=3$ and 1 for $r_1^*=4$, or 0 for $r_1^*=4$ and 1 for $r_1^*=3$; while if $r_0^*=5, 6, 7, 8$ then, two bits can be used to encode $r_1^*$: 0, 1, 2, and 3 can be for $r_1^*=5, 6, 7, 8$, respectively, and here 0, 1, 2, and 3 can be represented by two bits.

According to an example embodiment, the UE may be able to determine the RI with PTI=1 report conditioned on a previously reported first PMI or W1 report and a previously reported RI with PTI=1 report. A detailed description of an exemplary determination of the RI with PTI=1 report from the previously reported first PMI or W1 report and the previously reported RI with PTI=1 report is provided below. Although it may be possible to utilize any previously reported W1 or first PMI report to determine the RI with PTI=1 report, the most recently reported (or similarly, last reported) W1 or first PMI report may produce the RI with PTI=1 report that provides the best overall communications system performance.

As an illustrative example, consider codebook based precoding for closed loop MIMO communications system and a dual index or double codebook based codebook. The determination of the RI with PTI=1 report conditioned on the most recently reported (or similarly, last reported) W1 or first PMI report and the most recently reported (or similarly, last reported) RI with PTI=1 report and may be expressed as $$r_1^* = \arg \max_{r_1 \in R_{r_1',i_1^*}^{(1)}} \left( \max_{i_2} f_{WB}(W_{i_1^*,i_2}^{(r_1)}) \right),$$

where $r_1'$ is the previously reported (e.g., most recently or last reported) RI with PTI=1 report, $i_1^*$ is the most recently reported or last reported W1 or first PMI report, and $R_{r_1',i_1^*}^{(1)}$ represents a set of allowable $r_1$ values such that W1 corresponding to first PMI $i_1^*$ in a rank-$r_1$ codebook is same as W1 corresponding to first PMI $i_1^*$ in a rank-$r_1'$ codebook. More specifically, the candidate $r_1$ can be given in Table 2.

TABLE 2

Candidate RI with PTI = 1 reports conditioned on previously reported RI with PTI = 1 and a first PMI.

| | $r_1'$, the last reported RI with PTI = 1 | | | |
|---|---|---|---|---|
| | | | 5, 6, 7 | |
| | 1, 2 | 3, 4 | $i_1^* = 0$ $i_1^* = 1, 2, 3$ | 8 |
| Candidate values of $r_1$ | 1, 2 | 3, 4 | 5, 6, 7, 8   5, 6, 7 | 5, 6, 7, 8 |

Therefore, for a given value of $r_1'$, the UE may determine a set of candidate values for $r_1$ conditioned on the value of $r_1'$ (using Table 2, for example). In other words, the value of $r_1'$ is used to determine (condition) the set of candidate values for $r_1$. The UE may then select a value from the set of candidate values as the RI with PTI=1 report based on the channel measurement. As an illustrative example, consider a situation wherein $r_1'=2$, then the set of candidate values for $r_1$ comprises 1 and 2. The UE may then select either 1 or 2 for the RI with PTI=1 report depending on its channel measurement. As another illustrative example, consider a situation wherein $r_1'=5$ and $i_1^*=0$, then the set of candidate values for $r_1$ comprises 5, 6, 7 and 8. The UE may then select either 5, 6, 7 or 8 for the RI with PTI=1 report depending on its channel measurement.

Furthermore, $$f_{WB}(W_{i_1^*,i_2}^{(r_1)}) = \sum_{s \in S} C_s(W_{i_1^*,i_2}^{(r_1)}),$$

where S represents the set of subbands and spans the entire system bandwidth, and s represents a subband belonging to S.

Alternatively, the determination of RI with PTI=1 report conditioned on the previously reported (e.g., most recently reported or last reported) RI with PTI=1 report and the previously reported (e.g., most recently reported or last reported) W1 or first PMI report can also be expressed as $$r_1^* = \arg \max_{r_1 \in R_{r_0',i_1^*}^{(1)}} \left( \sum_{s \in S} \max_{i_2}(C_s(W_{i_1^*,i_2}^{(r_1)})) \right),$$

where $C_s(W_{i_1^*,i_2}^{(r_1)})$ represents the total throughput, capacity, or other metrics when transmitting utilizing precoding matrix $W_{i_1^*,i_2}^{(r_1)}$ on subband s and it can be derived based on the following equation $$y=HPx+n, \quad P=W_{i_1^*,i_2}^{(r_1)},$$

by utilizing MIMO capacity formula or other metric such as mutual information based metric, for example.

Furthermore, the rank indicator with PTI=1 can be further encoded into at most a two bit representation. As an illustrative example, from Table 1, if $r_1'=1, 2$, then one bit can be used to encode $r_1^*$: 0 for $r_1^*=1$ and 1 for $r_1^*=2$, or 0 for $r_1^*=2$ and 1 for $r_1^*=1$; while if $r_1'=3, 4$ then, one bit can be used to encode $r_1^*$: 0 for $r_1^*=3$ and 1 for $r_1^*=4$, or 0 for $r_1^*=4$ and 1 for $r_1^*=3$; while if $r_1'=5, 6, 7, 8$; two bits can be used to encode $r_1^*$: 0, 1, 2, and 3 can be for $r_1^*=5, 6, 7, 8$, respectively, and here 0, 1, 2, and 3 can be represented by two bits.

FIG. 4b illustrates a second diagram 430 of CSI feedback transmitted by a UE to an eNB, wherein one of the CSI is determined conditioned on previously reported CSI. Second diagram 430 displays a number of feedbacks of CSI by a UE to an eNB, including a wideband W2 or wideband second PMI report (shown as subframe 435). However, as discussed previously, the UE may not know how to determine the wideband second PMI or W2 report when PTI is set to 1.

According to an example embodiment, the UE may be able to determine the wideband W2 or wideband second PMI report conditioned on a RI with PTI=1 report (shown as subframe 440) and a W1 or first PMI report (shown as subframe 445). A detailed description of an exemplary determination of the wideband W2 or wideband second PMI report is provided below. Although it may be possible to utilize any previously reported RI with PTI=1 report and any previously reported W1 or first PMI report to determine the wideband second PMI or W2 report as long as there exists a previously reported W1 or first PMI report, which belongs to a different CSI report sequence, the most recently reported (or similarly, last reported) RI with PTI=1 report and the most recently reported (or similarly, last reported) W1 or first PMI report (as long as there exists a previously reported W1 or first PMI report, which belongs to a different CSI report sequence) may produce the wideband W2 or wideband second PMI report that provides the best overall communications system performance. It is noted that the RI with PTI=1 report may be determined conditioned on previously reported CSI such as described in the description of FIG. 4a.

As an illustrative example, considering the above mentioned MIMO system and dual index or double codebook based codebook, the determination of the wideband W2 or wideband second PMI report conditioned on the most recently reported (or similarly, last reported) RI with PTI=1 report and the most recently reported (or similarly, last reported) first PMI or W1 report may be expressed as $$i_2^* = \underset{i_2}{\mathrm{argmax}}\, f_{WB}\big(W_{i_1^*,i_2}^{(r_1^*)}\big),$$

where $r_1^*$ and $i_1^*$ is the most recently reported (or similarly, last reported) RI with PTI=1 report and the most recently reported (or similarly, last reported) wideband first PMI or W1 report, respectively.

Furthermore, $$f_{WB}\big(W_{i_1^*,i_2}^{(r_1^*)}\big) = \sum_{s \in S} C_s\big(W_{i_1^*,i_2}^{(r_1^*)}\big),$$

where S represents the set of subbands and spans the entire system bandwidth, s represents a subband belonging to S, and $C_s(W_{i_1^*,i_2}^{(r_1^*)})$ represents the total throughput, capacity, or other metrics when transmitting utilizes precoding matrix $W_{i_1^*,i_2}^{(r_1^*)}$ on subband s and it can be derived based on $$y = HPx + n,\; P = W_{i_1^*,i_2}^{(r_1^*)},$$

by utilizing MIMO capacity formula or other metric such as mutual information based metric, for example. Furthermore, a wideband CQI can be calculated conditioned on the precoding matrix $W_{i_1^*,i_2^*}^{(r_1^*)}$ assuming transmission occurs over set S subbands or the entire system bandwidth.

Figure 4C:
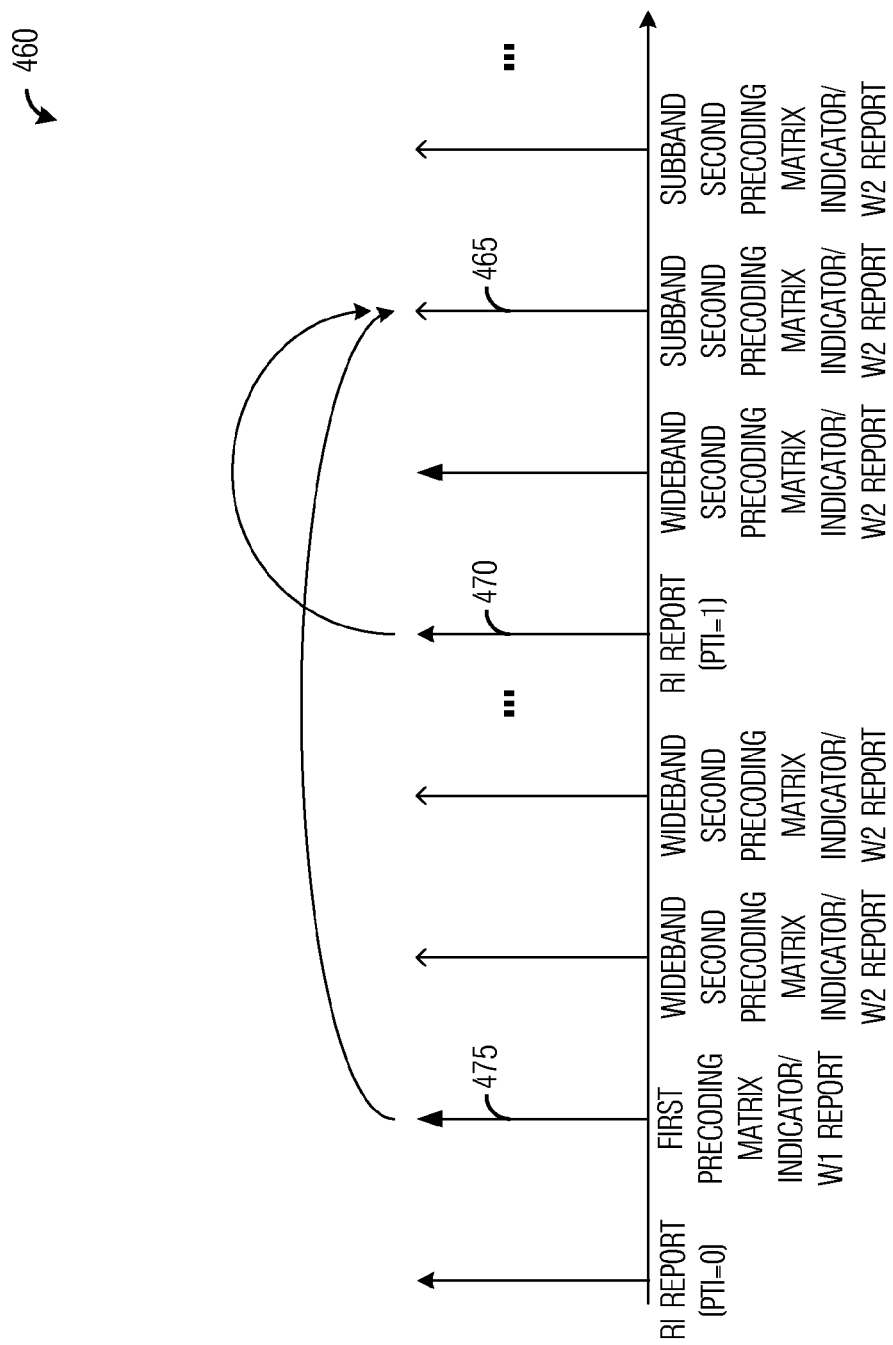
FIG. 4c illustrates an example third diagram of CSI feedback transmitted by a UE to an eNB, wherein one of the CSI is determined conditioned on previously reported CSI according to example embodiments described herein.

FIG. 4c illustrates a third diagram 460 of CSI feedback transmitted by a UE to an eNB, wherein one of the CSI is determined conditioned on previously reported CSI. Third diagram 460 displays a number of feedbacks of CSI by a UE to an eNB, including a subband W2 or second PMI report (shown as subframe 465). However, as discussed previously, the UE may not know how to determine the subband second PMI or W2 report when PTI is set to 1.

According to an example embodiment, the UE may be able to determine the subband W2 or second PMI report conditioned on a RI with PTI=1 report (shown as subframe 470) and a W1 or first PMI report (shown as subframe 475). A detailed description of an exemplary determination of the subband W2 or second PMI report is provided below. Although it may be possible to utilize any previously reported RI with PTI=1 report and any previously reported W1 or first PMI report to determine the subband W2 or second PMI report as long as there exists a previously reported W1 or first PMI report that belongs to a different CSI report sequence, the most recently reported (or similarly, last reported) RI with PTI=1 report and the most recently reported (or similarly, last reported) first PMI or W1 report (as long as there exists a previously reported W1 or first PMI report, which belongs to a different CSI report sequence) may produce the subband W2 or second PMI report that provides the best overall communications system performance. It is noted that the RI with PTI=1 report may be determined conditioned on previously reported CSI such as described in the description of FIG. 4a.

As an illustrative example, considering the above mentioned MIMO system and dual index or double codebook based codebook, the determination of the subband W2 or second PMI report conditioned on the most recently reported (or similarly, last reported) RI with PTI=1 report and the most recently reported (or similarly, last reported) W1 or first PMI report may be expressed as $$i_2^* = \underset{i_2}{\mathrm{argmax}}\, C_{s^*}\big(W_{i_1^*,i_2}^{(r_1^*)}\big),$$

where $r_1^*$ and $i_1^*$ are the most recently reported (or similarly, last reported) RI with PTI=1 report and the most recently reported (or similarly, last reported) wideband W1 or first PMI report, respectively, and $s^*$ represents the subband selected by UE. It is noted that a subband selection indicator or a subband label in a BP can be reported with subband second PMI report for this situation. The subband selected from a BP can be expressed by $$s^* = \underset{s}{\mathrm{argmax}}\Big(\underset{i_2}{\max}\, C_s\big(W_{i_1^*,i_2}^{(r_1^*)}\big)\Big),$$

where s belongs to a particular BP or determined by predefined cycling (for this situation, the subband selection indicator or the subband label may be used by a predefined cycling pattern known by the UE and the eNB and may not necessarily be reported. For example, the subband label may be used in increasing order of frequency per BP. Furthermore, $C_{s^*}(W_{i_1^*,i_2}^{(r_1^*)})$ represents the total throughput, capacity, or other metrics when transmitting utilizes precoding matrix $W_{i_1^*,i_2}^{(r_1^*)}$ on subband $s^*$ and it can be derived based on $$y = HPx + n,\; P = W_{i_1^*,i_2}^{(r_1^*)},$$

by utilizing MIMO capacity formula or other metric such as mutual information based metric, for example. Furthermore, a subband CQI can be calculated conditioned on the precoding matrix $W_{i_1^*,i_2^*}^{(r_1^*)}$ assuming transmission over subband $s^*$.

According to an example embodiment, the UE may determine a PTI. A detailed description of an exemplary determination of the PTI is provided below. The PTI can be set to 0 and reported with RI for the first feedback, as an example. Then several PTI=0 or PTI=1 can be fed back at different instances based on a RI report period, which can be according to a predefined cycling pattern (for example, five report instances of PTI=1 per one report instance of PTI=0 or two report instances of PTI=0 followed by one report instance of PTI=1), channel conditions or traffic type, or so on. Furthermore, PTI can be also reported at a different subframe from the RI report, for example, PTI can be reported with the same period but with an offset with respect to the RI report.

According to an example embodiment, the UE may determine a RI when PTI=0 report. A detailed description of an exemplary determination of the RI with PTI=0 report is provided below.

As an illustrative example, consider codebook based precoding for closed loop MIMO communications system and a dual index or double codebook based codebook. The determination of the RI with PTI=0 report may be expressed as $$r_0^* = \operatorname*{argmax}_{r_0}\left(\max_{i_1, i_2} f_{WB}(W_{i_1, i_2}^{(r_0)})\right),$$

and $$f_{WB}(W_{i_1, i_2}^{(r_0)}) = \sum_{s \in S} C_s(W_{i_1, i_2}^{(r_0)}),$$

where S represents the set of subbands and spans the entire system bandwidth, and s represents a subband belonging to S.

Alternatively, the determination of RI when with PTI=0 can also be expressed as $$r_0^* = \operatorname*{argmax}_{r_0}\left(\max_{i_1} \sum_{s \in S} \max_{i_2}(C_s(W_{i_1, i_2}^{(r_0)}))\right),$$

where $C_s(W_{i_1, i_2}^{(r_0)})$ represents the total throughput, capacity, or other metrics when transmitting utilizing precoding matrix $W_{i_1, i_2}^{(r_0)}$ on subband s and it can be derived based on the following equation $$y = HPx + n, \ P = W_{i_1, i_2}^{(r_0)},$$

by utilizing MIMO capacity formula or other metric such as mutual information based metric, for example.

According to an example embodiment, the UE may determine a wideband W1 or wideband first PMI report conditioned on a previously reported (e.g., most recently reported or the last reported) RI with PTI=0 report. A detailed description of an exemplary determination of the wideband W1 or wideband first PMI report is provided below.

As an illustrative example, considering the above mentioned MIMO system and dual index or double codebook based codebook, the determination of the wideband W1 or wideband first PMI report conditioned on the last reported (or similarly, most recently reported) RI with PTI=0 report may be expressed as $$i_1^* = \operatorname*{argmax}_{i_1}\left(\max_{i_2} f_{WB}(W_{i_1, i_2}^{(r_0^*)})\right),$$

where $r_0^*$ is the most recently reported or the last reported RI with PTI=0.

Furthermore, $$f_{WB}(W_{i_1, i_2}^{(r_0^*)}) = \sum_{s \in S} C_s(W_{i_1, i_2}^{(r_0^*)}),$$

where S represents the set of subbands and spans the entire system bandwidth, s represents a subband belonging to S.

Alternatively, the determination of the wideband W1 or wideband first PMI report conditioned on the last reported RI with PTI=0 report may be expressed as $$i_1^* = \operatorname*{argmax}_{i_1}\left(\sum_{s \in S} \max_{i_2} C_s(W_{i_1, i_2}^{(r_0^*)})\right),$$

where $C_s(W_{i_1, i_2}^{(r_0^*)})$ represents the total throughput, capacity, or other metrics when transmitting utilizing precoding matrix $W_{i_1, i_2}^{(r_0^*)}$ on subband s and it can be derived based on $$y = HPx + n, \ P = W_{i_1, i_2}^{(r_0^*)}$$

by utilizing MIMO capacity formula or other metric such as mutual information based metric, for example.

According to an example embodiment, the UE may determine a wideband W2 or wideband second PMI report conditioned on previously reported (e.g., most recently reported or the last reported) RI with PTI=0 report and previously reported (e.g., most recently reported or the last reported) wideband first PMI report when PTI=0. A detailed description of an exemplary determination of the wideband W2 or wideband second PMI report is provided below.

As an illustrative example, considering the above mentioned MIMO system and dual index or double codebook based codebook, the determination of the wideband W2 or wideband second PMI report conditioned on the last reported or most recently reported RI with PTI=0 report and the wideband W1 or the first PMI report when PTI=0 may be expressed as $$i_2^* = \operatorname*{argmax}_{i_2} f_{WB}(W_{i_1^*, i_2}^{(r_0^*)}),$$

where $r_0^*$ and $i_1^*$ are the most recently reported or the last reported RI and wideband first PMI when PTI is set to 0. Furthermore, $$f_{WB}(W_{i_1^*, i_2}^{(r_0^*)}) = \sum_{s \in S} C_s(W_{i_1^*, i_2}^{(r_0^*)}),$$

where S represents the set of subbands and spans the entire system bandwidth, s represents a subband belonging to S. $C_s(W_{i_1^*, i_2}^{(r_0^*)})$ represents the total throughput, capacity, or other metrics when transmitting utilizing precoding matrix $W_{i_1^*, i_2}^{(r_0^*)}$ on subband s and it can be derived based on $$y = HPx + n, \ P = W_{i_1^*, i_2}^{(r_0^*)},$$

by utilizing MIMO capacity formula or other metric such as mutual information based metric, for example. Furthermore, a wideband CQI can be calculated conditioned on the precoding matrix $W_{i_1^*, i_2^*}^{(r_0^*)}$ assuming transmission occurs over set S subbands or the entire system bandwidth.

According to an example embodiment, the eNB may receive PTI and/or RI reports. Specifically, PTI and/or RI reports can be received at a predefined subframe. For example, the subframe may be at a multiple of a period for CQI or PMI reports with specified offset, which can be configured by higher layer signaling.

According to an example embodiment, the eNB may receive a wideband first PMI report based on a most recently received PTI report. Specifically, based on the most recently received PTI=0 report, eNB may receive the wideband first PMI report at a particular subframe, which can be configured by higher layer signaling and may be different for different values of PTI.

According to an example embodiment, the eNB may receive a wideband second PMI report conditioned on the most recently received PTI. Specifically, based on the most recently received PTI=0 or PTI=1 report, eNB may receive the wideband second PMI report at a particular subframe, which can be configured by higher layer signaling and may be different for different values of PTI. Furthermore, a wideband CQI report can be also received together with the wideband second PMI report.

According to an example embodiment, the eNB may receive a subband second PMI report conditioned on the most recently received PTI. Specifically, based on the most recently received PTI=1 report, eNB may receive the subband second PMI report at a particular subframe, which can be configured by higher layer signaling; Furthermore, a subband CQI report can be also received together with the wideband second PMI report.

According to an example embodiment, the eNB may obtain a precoding matrix based the most recently received PTI and CSI reports. A detailed description of an exemplary reception of PTI and/or RI reports is provided below. If the most recently received PTI report comprises a PTI=0 report, then the precoding matrix can be $W_{i_1*,i_2*}^{(r_0*)}$ where $r_0*$, $i_1*$ and $i_2*$ are most recently RI, first PMI, and second PMI when PTI=0, respectively. If the most recently received PTI report comprises a PTI=1 report, then the precoding matrix can be $W_{i_1*,i_2*}^{(r*)}$ where $i_2*$ is the most recently or last received (wideband or subband) second PMI report when PTI=1, is the most recently or last received first PMI when PTI=0, and r* is the most recently RI when PTI=0 or PTI=1 that is consistent with assumptions at UE regarding the value of PTI.

Figure 5:
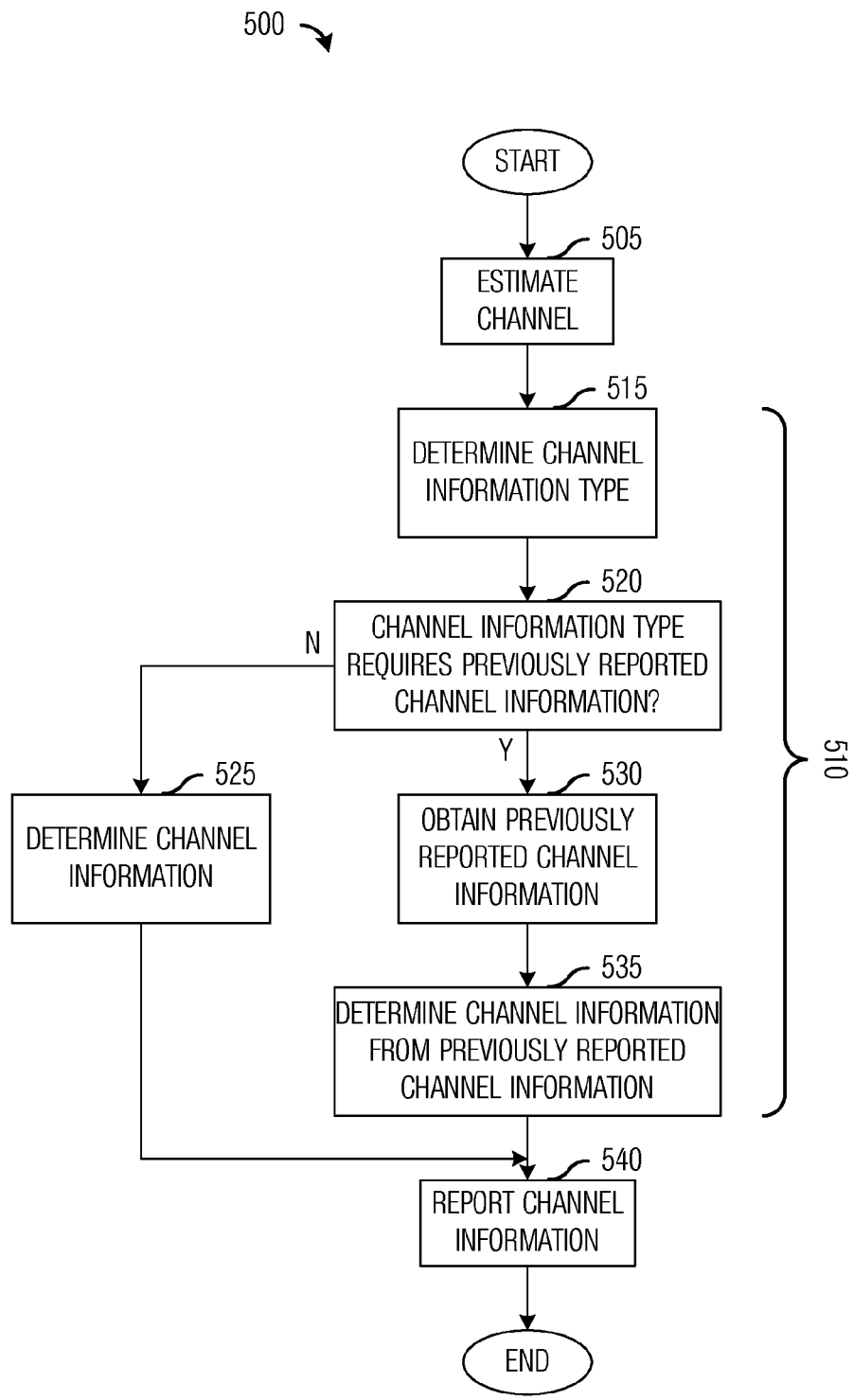
FIG. 5 illustrates an example flow diagram of UE operations in reporting CSI to an eNB according to example embodiments described herein.

FIG. 5 illustrates a flow diagram of UE operations 500 in reporting CSI to an eNB. UE operations 500 may be indicative of operations occurring in a UE, such as UE 110 or UE 203, as the UE reports CSI to an eNB, such as eNB 105 or eNB 201. UE operations 500 may occur while the UE is in a normal operating mode.

UE operations 500 may begin with the UE estimating a channel between itself and the eNB (block 505). According to an example embodiment, the UE may estimate the channel based on signals transmitted by the eNB. As an example, the UE may estimate the channel based on a pilot signal, a reference signal such as cell specific reference signal (CRS) or channel state information reference signal (CSI-RS), a preamble, or so on, transmitted by the eNB.

The UE may determine the CSI to be reported to the eNB (block 510) based on the channel estimate or channel measurement. According to an example embodiment, how the UE determines the CSI to be reported to the eNB depends upon the type of CSI reported to the eNB, e.g., PTI=0 or PTI=1. As an example, certain CSI may be determinable by the UE without being conditioned on the previously reported CSI associated with a different type of CSI, while other CSI may require the UE to determine the CSI conditioned on the previously reported CSI associated with a different type of CSI.

The UE may determine the type of CSI, where the CSI is to be reported to the eNB (block 515). As an illustrative example, in order to support closed loop MIMO, the types of CSI by the UE may include PTI=1, PTI=0, and so on.

With the type of CSI determined, the UE may perform a check to determine if the CSI requires knowledge of previously reported CSI, which may or may not be associated with a different type of CSI (block 520). If the CSI does not require knowledge of previously reported CSI associated with a different type of CSI, the UE may determine the CSI from the measurements of the channel (block 525).

However, if the CSI does require knowledge of previously reported CSI, the UE may obtain the previously reported CSI dependent on the type of CSI (block 530). As illustrative examples, CSI that does require knowledge of previously reported CSI associated with a different type of CSI include RI report with PTI=1, wideband W2 or second PMI report with PTI=1, subband W2 or second PMI report with PTI=1, and so forth.

Figure 6A:
FIGS. 6a through 6c illustrate several example determining of CSI conditioned on previously reported CSI according to example embodiments described herein.
Figure 6B:
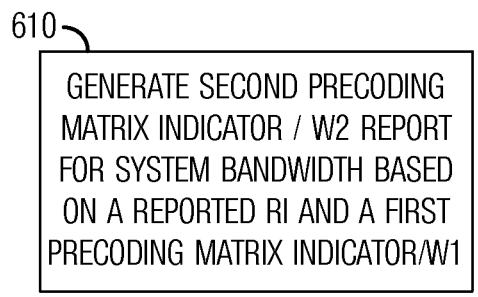
Figure 6C:
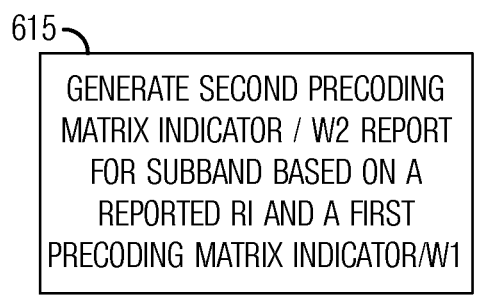

The UE may determine the CSI conditioned on the previously reported CSI and potentially the type of CSI (block 535). As illustrative examples, the UE may determine the RI with PTI=1 report conditioned on the most recently (or last) reported wideband W1 or first PMI report and the most recently reported (or last reported) RI with PTI=0 report (as shown in blocks 605 in FIG. 6a); the wideband W2 or second PMI report conditioned on the most recently reported (or last reported) RI with PTI=1 report and the most recently reported (or last reported) wideband W1 or first PMI report (as shown in block 610 in FIG. 6b); the subband W2 or second PMI report conditioned on the most recently reported (or last reported) RI with PTI=1 report and the most recently reported (or last reported) wideband W1 or first PMI report (as shown in block 615 in FIG. 6c); and so on.

According to an example embodiment, depending on the CSI, the previously reported CSI that the UE uses to condition its determination of the CSI is associated with a CSI report sequence different from a CSI report sequence that is associated with the CSI that it is determining. As an illustrative example, the UE may determine the RI with PTI=1 report belonging to the second CSI report sequence conditioned on the most recently reported (or last reported) wideband W1 or first PMI report and the most recently reported (or last reported) RI with PTI=0 report associated with the first CSI report sequence.

The UE may report the CSI to the eNB (block 540). Alternatively, the UE may report the type of CSI or both the CSI and the type of CSI to the eNB.

Figure 7:
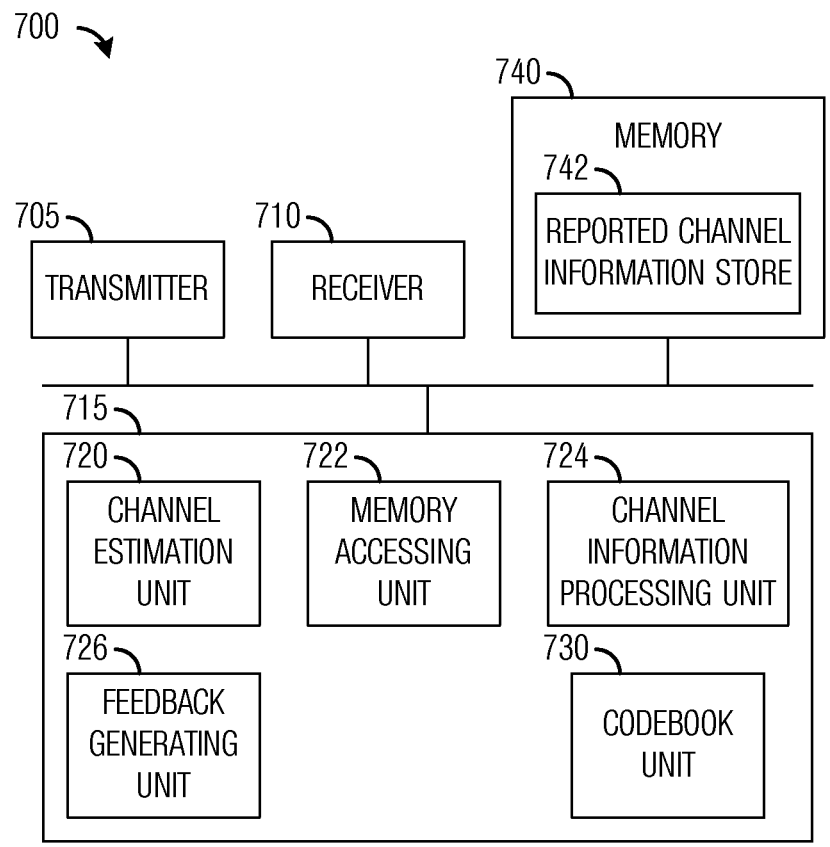
FIG. 7 illustrates an example communications device according to example embodiments described herein.

FIG. 7 provides an illustration of a communications device 700. Communications device 700 may be an implementation of a UE, MS, or so on. Communications device 700 may be used to implement various ones of the embodiments discussed herein. As shown in FIG. 7, a transmitter 705 is configured to transmit information and a receiver 710 is configured to receive information. Transmitter 705 and receiver 710 may have a wireless interface, a wireline interface, or a combination thereof. In practice, transmitter 705 and receiver 710 might be implemented in a single unit of hardware.

A channel estimation unit 720 is configured to measure a channel between communications device 700 and an eNB (or a BS or any other form of communications controller). Channel estimation unit 720 makes use of signals, such as pilot signals, reference signals, preambles, and so on, transmitted by the eNB to measure the channel. A memory accessing unit 722 is configured to retrieve previously reported channel information from a memory 740 in order to determine certain types of channel information to report to the eNB. The previously reported channel information may be organized in a reported channel information store 742, for example.

A channel information processing unit 724 is configured to determine CSI to report to the eNB. Depending on the type of the CSI being reported, channel information processing unit 724 may make use of channel measurements, previously reported channel information, CSI type, or a combination thereof to determine CSI. A feedback generating unit 726 is configured to generate feedback information from CSI. For example, feedback generating unit 626 may generate coded bit sequence and modulation symbol sequence from CSI.

A codebook unit 730 is configured to maintain a codebook to meet operating conditions. A memory 740 is configured to store reported channel information, channel measurements, and so forth.

The elements of communications device 700 may be implemented as specific hardware logic blocks. In an alternative, the elements of communications device 700 may be implemented as software executing in a processor, microprocessor, digital signal processor, controller, application specific integrated circuit, or so on. In yet another alternative, the elements of communications device 700 may be implemented as a combination of software and/or hardware.

As an example, transmitter 705 and receiver 710 may be implemented as a specific hardware block, while channel estimation unit 720, memory accessing unit 722, channel information processing unit 724, feedback generating unit 726, and codebook unit 730 may be software modules executing in a processor 715, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reporting channel information, the method comprising:
   determining, by a user equipment, a precoding type indication (PTI) for first channel information to be reported to a communications controller of a wireless communications system;
   determining, by the user equipment, the first channel information conditioned on second channel information comprising a last reported rank indicator and a first precoding matrix indicator, and on the PTI; and
   reporting, by the user equipment to the communications controller, the first channel information in a subframe of the wireless communications system.

2. The method of claim 1, wherein the first channel information comprises channel state information.

3. The method of claim 1, wherein the determining the first channel information comprises:
   selecting a candidate channel information set in accordance with the second channel information; and
   selecting the first channel information from the candidate channel information set.

4. The method of claim 1, wherein the PTI comprises a first PTI value, and wherein the determining the first channel information comprises determining a rank indicator with the first PTI value conditioned on the second channel information.

5. The method of claim 4, wherein the first PTI value is equal to 1, and wherein the determining the rank indicator with the first PTI value comprises:
   selecting a set of candidate rank indicators from a plurality of sets of candidate rank indicators in accordance with the last reported rank indicator and the first precoding matrix indicator; and
   selecting a candidate rank indicator from the set of candidate rank indicators as the rank indicator with the first PTI value, wherein the plurality of sets of candidate rank indicators are as shown,

| | last reported rank indicator with the PTI = 0 or 1 | | | | |
|---|---|---|---|---|---|
| | | | 5, 6, 7 | | |
| | 1, 2 | 3, 4 | $i_1 = 0$ | $i_1 = 1, 2, 3$ | 8 |
| Set of candidate rank indicators with the PTI = 1 | 1, 2 | 3, 4 | 5, 6, 7, 8 | 5, 6, 7 | 5, 6, 7, 8 | where $i_1$ is a last reported first precoding matrix indicator.

6. The method of claim 5, wherein the determining the rank indicator with the first PTI value further comprises encoding the rank indicator with the first PTI value into at most two bit representation.

7. The method of claim 4, wherein the first precoding matrix indicator is obtained conditioned on a second PTI value.

8. The method of claim 1, wherein the PTI comprises a first PTI value, and wherein the determining the first channel information comprises determining a wideband second precoding matrix indicator conditioned on the second channel information.

9. The method of claim 8, wherein the first precoding matrix indicator is obtained conditioned on a second PTI value.

10. The method of claim 1, wherein the PTI comprises a first PTI value, and wherein the determining the first channel information comprises determining a subband second precoding matrix indicator conditioned on the second channel information.

11. The method of claim 10, wherein the first precoding matrix indicator is obtained conditioned on a second PTI value.

12. A user equipment comprising:
   a processor configured to determine a precoding type indication (PTI) for first channel information to be reported to a communications controller of a wireless communications system, and to determine the first channel information conditioned on second channel information comprising a last reported rank indicator and a first precoding matrix indicator, and on the PTI; and a transmitter coupled to the processor, the transmitter configured to report the first channel information in a subframe of the wireless communications system.

13. The user equipment of claim 12, wherein the processor is configured to select a candidate channel information set in accordance with the second channel information, and to select the first channel information from the candidate channel information set.

14. The user equipment of claim 12, wherein the PTI comprise a first PTI value, and wherein the processor is configured to determine a rank indicator with the first PTI value conditioned on the second channel information as the first channel information.

15. The user equipment of claim 14, wherein the first precoding matrix indicator is obtained conditioned in a second PTI value.

16. The user equipment of claim 12, wherein the PTI comprises a first PTI value, and wherein the processor is configured to determine a wideband second precoding matrix indicator conditioned on the second channel information as the first channel information.

17. The user equipment of claim 16, wherein the first precoding matrix indicator is obtained conditioned in a second PTI value.

18. The user equipment of claim 12, wherein the PTI comprises a first PTI value, and wherein the processor determines a subband second precoding matrix indicator conditioned on the second channel information as the first channel information.

19. The user equipment of claim 18, wherein the first precoding matrix indicator is obtained conditioned in a second PTI value.

20. A communications system comprising:
a user equipment comprising:
a wireless interface communicatively coupled to a communications controller; and
a processor configured to determine a precoding type indication (PTI) for first channel information to be reported to the communication controller, to determine the first channel information conditioned on second channel information comprising a last reported rank indicator and a first precoding matrix indicator, and on the PTI, and to report the first channel information in a subframe to the communications controller.

21. The communications system of claim 20, wherein the PTI comprises a first PTI value, and wherein the processor is configured to determine a rank indicator with the first PTI value conditioned on the second channel information as the first channel information.

22. The communication system of claim 21, wherein the first precoding matrix indicator is obtained conditioned on a second PTI value.

23. The communications system of claim 20, wherein the PTI comprises a first PTI value, and wherein the processor is configured to determine a wideband second precoding matrix indicator conditioned on the second channel information as the first channel information.

24. The communication system of claim 23, wherein the first precoding matrix indicator is obtained conditioned on a second PTI value.

25. The communications system of claim 20, wherein the PTI comprises a first PTI value, and wherein the processor determines a subband second precoding matrix indicator conditioned on the second channel information as the first channel information.

26. The communication system of claim 25, wherein the first precoding matrix indicator is obtained conditioned on a second PTI value.

27. The method of claim 1, wherein the first precoding matrix indicator is a last reported first precoding matrix indicator.

28. The user equipment of claim 12, wherein the first precoding matrix indicator is a last reported first precoding matrix indicator.

29. The communication system of claim 20, wherein the first precoding matrix indicator is a last reported first precoding matrix indicator.

30. The method of claim 1, wherein the first channel information comprises a second precoding matrix indicator.

31. The user equipment of claim 12, wherein the first channel information comprises a second precoding matrix indicator.

32. The communications system of claim 20, wherein the first channel information comprises a second precoding matrix indicator.

* * * * *